(12) United States Patent
Mitsuhashi

(10) Patent No.: US 11,281,179 B2
(45) Date of Patent: Mar. 22, 2022

(54) TRACING APPARATUS

(71) Applicant: FANUC CORPORATION, Yamanashi (JP)

(72) Inventor: Dai Mitsuhashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/449,966

(22) Filed: Jun. 24, 2019

(65) Prior Publication Data

US 2020/0041973 A1 Feb. 6, 2020

(30) Foreign Application Priority Data

Aug. 3, 2018 (JP) .............................. JP2018-146568

(51) Int. Cl.
*G05B 19/05* (2006.01)
*G06F 11/34* (2006.01)
*G06F 11/36* (2006.01)

(52) U.S. Cl.
CPC ......... *G05B 19/056* (2013.01); *G05B 19/058* (2013.01); *G06F 11/3466* (2013.01); *G06F 11/3636* (2013.01); *G05B 2219/13037* (2013.01)

(58) Field of Classification Search
None
See application file for complete search history.

(56) References Cited

U.S. PATENT DOCUMENTS

| 2006/0015314 A1* | 1/2006 | Roesner | G06F 11/3636 703/22 |
| 2017/0212798 A1* | 7/2017 | Satou | G06F 11/3471 |
| 2018/0203428 A1* | 7/2018 | Thabuis | G05B 19/058 |

FOREIGN PATENT DOCUMENTS

| JP | 8-305418 | 11/1996 |
| JP | 5362148 | 12/2013 |

* cited by examiner

*Primary Examiner* — Lewis A Bullock, Jr.
*Assistant Examiner* — Mark A Gooray
(74) *Attorney, Agent, or Firm* — Wenderoth, Lind & Ponack, L.L.P.

(57) ABSTRACT

A tracing apparatus communicably connected to a programmable logic controller (PLC) that inputs and outputs a signal based on a ladder program, includes a constituent element setting unit configured to set a plurality of constituent elements to be traced among the constituent elements of the ladder program, a tracing data acquisition unit configured to acquire tracing data indicating a signal state of the constituent element at a specified timing, at a predetermined sampling cycle, a section detection unit configured to detect a sampling cycle section in which two or more of the acquired tracing data corresponding to the constituent elements simultaneously change, a change sequence calculation unit configured to calculate change sequence of signals of the constituent elements simultaneously changing in the detected sampling cycle section, and a change sequence output unit configured to output the calculated change sequence of the signals of the constituent elements.

7 Claims, 7 Drawing Sheets

TRACING APPARATUS

This application is based on and claims the benefit of priority from Japanese Patent Application No. 2018-146568, filed on 3 Aug. 2018, the content of which is incorporated herein by reference.

BACKGROUND OP THE INVENTION

Field of the Invention

The present invention relates to a tracing apparatus employing a sequence control program.

Related Art

Recently, a control system of a machine tool control apparatus using a programmable logic controller (PLC) has been known. For example, a machine tool and a robot used in machining are respectively controlled by a control apparatus. The machine tool control apparatus refers to a control apparatus for a common machine tool such as a lathe or a machining center. For a dedicated machine tool designed for a specific use, a PLC software is executed by a machine tool control apparatus.

A PLC controls a machine tool control apparatus by executing a ladder program. A debugging apparatus verifies whether control can be performed as expected with a ladder program (for example, see Patent Documents 1 and 2). Furthermore, when a phenomenon unexpected to a user occurs in the operation of a PLC, there is a known method of investigating a signal which causes the phenomenon by using a tracing function provided by a tracing apparatus.

Patent Document 1: Japanese Patent No. 5362148
Patent Document 2: Japanese Unexamined Patent Application, Publication No. H08-305418

SUMMARY OF THE INVENTION

The tracing function includes a sampling cycle, and signal changes within the cycle are treated as signal changes at the same timing. Therefore, the sequence of signal changes within the cycle cannot be determined from tracing results.

An object of the present invention is to provide a tracing apparatus which is capable of determining the sequence of signal changes within a cycle from tracing results.

(1) A tracing apparatus (for example, a tracing apparatus 100 described later) communicably connected to a programmable logic controller (PLC) (for example, a PLC 400 described later) that inputs and outputs a signal based on a sequence control program (for example, a ladder program described later) according to the present invention includes a constituent element setting unit (for example, a constituent element setting unit 111 described later) configured to set a plurality of constituent elements to be traced among the constituent elements of the sequence control program, a tracing data acquisition unit (for example, a tracing data acquisition unit 112 described later) configured to acquire tracing data indicating a signal state of the constituent element at a specified timing, at a predetermined sampling cycle, a section detection unit (for example, a section detection unit 113 described later) configured to detect a sampling cycle section in which two or more of the tracing data corresponding to the constituent elements acquired by the tracing data acquisition unit simultaneously change, a change sequence calculation unit (for example, a change sequence calculation unit 114 described later) configured to calculate change sequence of signals of the constituent elements simultaneously changing in the sampling cycle section detected by the section detection unit, and a change sequence output unit (for example, a change sequence output unit 115 described later) configured to output the change sequence of the signals of the constituent elements calculated by the change sequence calculation unit.

(2) In the tracing apparatus described in (1), the change sequence output unit may explicitly output the change sequence of the signals of the constituent elements together with the tracing data to a display unit (for example, a display unit 140 described later).

(3) In the tracing apparatus described in (2), the change sequence output unit may enlarge the sampling cycle section detected by the section detection unit to output the change sequence of the signals of the constituent elements.

(4) In the tracing apparatus described in (3), the change sequence output unit may output the change sequence of the signals of the constituent elements as an indication according to a change time.

(5) in the tracing apparatus described in any one of (2) to (4), the change sequence output unit may output a number corresponding to the change sequence of the signals of the constituent elements.

In the tracing apparatus described in any one of (1) to (5), the change sequence output unit may output the change sequence of the signals of the constituent elements together with the tracing data to a file.

(7) in the tracing apparatus described in any one of (1) to (6), the tracing apparatus may be included in the PLC.

According to the present invention, it is possible to provide a tracing apparatus which is capable of determining the sequence of signal changes within a cycle from tracing results.

DETAILED DESCRIPTION OF THE INVENTION

Embodiment

First, an outline of an embodiment of the present invention will be described. The present embodiment relates to a tracing apparatus communicably connected to a PLC that inputs and outputs a signal based on a ladder program, which indicates tracing results obtained as a result of executing the ladder program so as to determine the sequence of signal changes within a cycle.

Figure 1:
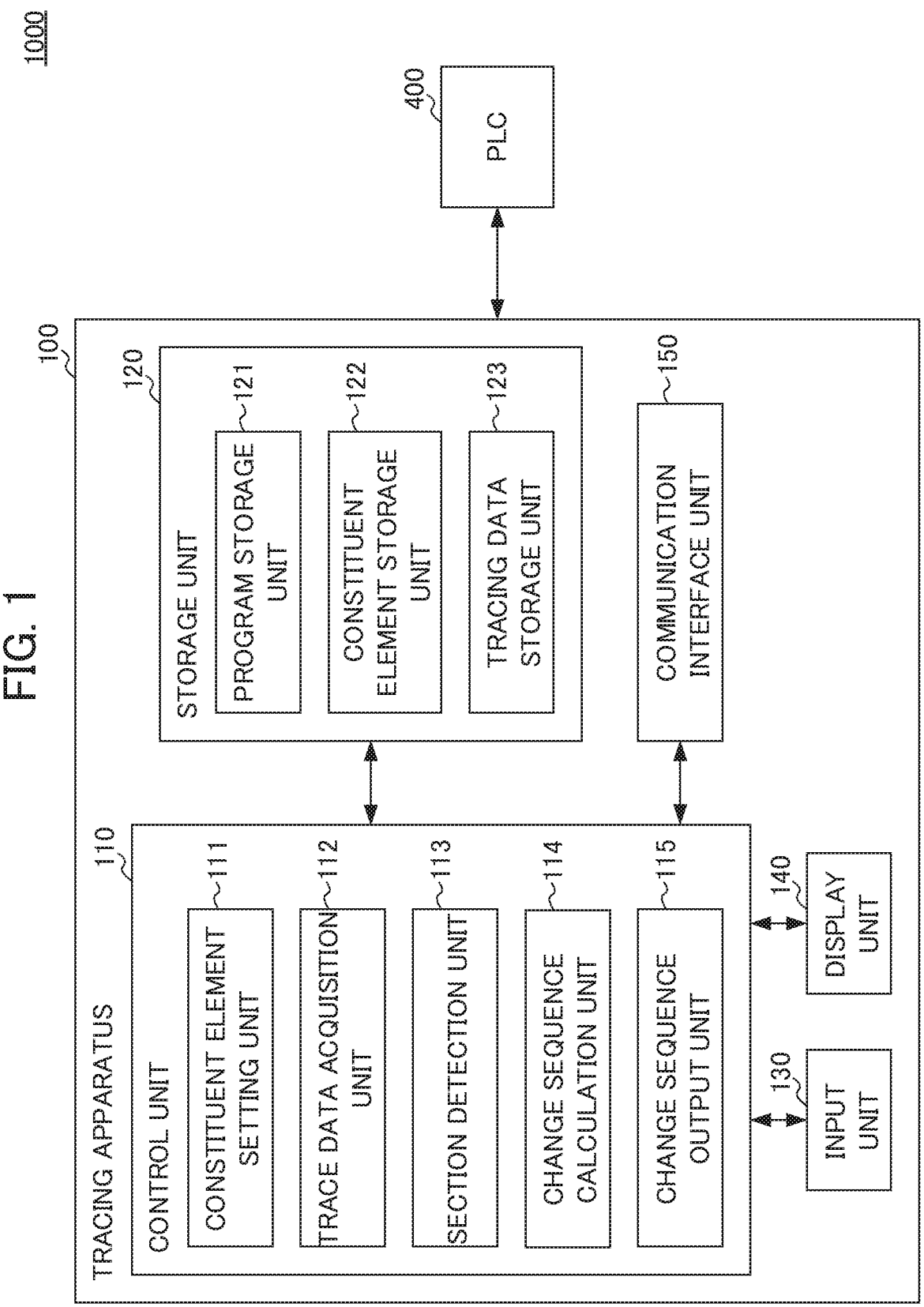
FIG. 1 is a schematic view of the basic configuration and the functional block diagram of a tracing apparatus of the present embodiment.

The configurations of a tracing system 1000 and a tracing apparatus 100 according to the present embodiment will be described with reference to FIG. 1. FIG. 1 is a schematic view of the basic configuration of and a functional block diagram of the tracing apparatus 100 of the present embodiment. The tracing system 1000 shown in FIG. 1 as the basic configuration of the present embodiment includes the tracing apparatus 100 and a PLC 400. In the tracing system 1000, when a plurality of constituent elements to be traced are set among the constituent elements included in a ladder program executed in the PLC 400, the tracing apparatus 100 displays the sequence in which the signals of the constituent elements to be traced change in a section in which the tracing data of the signals simultaneously change. The constituent elements refer to a contact and a coil (circuit) defined in the ladder program. The tracing apparatus 100 and the PLC 400 are communicably connected to each other through, for example, a direct connection via a connection interface.

[Tracing Apparatus 100]

The tracing apparatus 100 detects a sampling cycle section in which two or more of the tracing data corresponding to the constituent elements simultaneously change. The tracing apparatus 100 calculates the change sequence of the signals of the constituent elements simultaneously changing in the detected sampling cycle section. Then, the tracing apparatus 100 outputs the calculated change sequence of the signals of the constituent elements to, for example, a display unit 140. The tracing apparatus 100 is, for example, a personal computer (PC).

The tracing apparatus 100 includes a control unit 110, a storage unit 120, an input unit 130, a display unit 140, and a communication interface unit 150. The control unit 110 may be a central processing unit (CPU), and performs overall control of the tracing apparatus 100 by executing various programs for controlling the tracing apparatus 100 stored in the storage unit 120. The control unit 110 includes a constituent element setting unit 111, a tracing data acquisition unit 112, a section detection unit 113, a change sequence calculation unit 114, and a change sequence output unit 115. Each of these function units is fulfilled by the control unit 110 executing a program stored in the storage unit 120.

In the constituent element setting unit 111, a plurality of constituent elements to be traced are set through, for example, the input unit 130 among the constituent elements included in a ladder program executed in the PLC 400. The constituent element setting unit 111 may set one or more contacts and one or more coils as the constituent elements, or may set only a plurality of contacts or coils. The control unit 110 has the set constituent elements stored in the constituent element storage unit 122. The tracing data acquisition unit 112 acquires tracing data indicating a signal state of the constituent element at a specified timing, at a predetermined sampling cycle. The tracing data acquisition unit 112 acquires tracing data from, for example, the PLC 400. The tracing data indicates a signal state (ON/OFF) of each of the set constituent elements and is acquired at a specified timing. The control unit 110 has the acquired tracing data stored in the tracing data storage unit 123.

The section detection unit 113 detects a sampling cycle section in which two or more of the tracing data corresponding to the constituent elements acquired by the tracing data acquisition unit 112 simultaneously change. The change sequence calculation unit 114 calculates the change sequence of the signals of the constituent elements simultaneously changing in the sampling cycle section detected by the section detection unit 113. The change sequence calculation unit 114 calculates the change sequence of the signals of the constituent elements simultaneously changing in the sampling cycle section based on, for example, a ladder diagram (ladder) representing the content of a ladder program. The change sequence output unit 115 outputs the change sequence of the signals of the constituent elements calculated by the change sequence calculation unit 14 to, for example, the display unit 140. The change sequence output unit 115 may output, for example, the change sequence of the signals of the constituent elements together with the tracing data to the display unit 140.

The storage unit 120 is a storage area that stores programs executed by the control unit 110, and others. The storage unit 120 includes a program storage unit 121, a constituent element storage unit 122, and a tracing data storage unit 123. The program storage unit 121 is, for example, a storage area that stores programs for executing various functions of the control unit 110 described above. The constituent element storage unit 122 is a storage area that stores the constituent elements to be traced set through the input unit 130. The tracing data storage unit 123 is a storage area that stores acquired tracing data.

The input unit 130 is an input device such as a keyboard, a mouse, or a button such as a switch button. The display unit 140 is a display device, and is composed of, for example, a cathode ray tube (CRT), a liquid crystal display (LCD), or the like. A touch panel or a display device in which the input unit 130 and the display unit 140 are integrated may be provided. The communication interface unit 150 is a communication control device composed of, for example, a predetermined connector such as a connector for RS232C and for directly connecting with the PLC 400.

The tracing apparatus 100 may not be a PC, and may be provided in a machine tool control apparatus. For example, if the tracing apparatus 100 is provided in a machine tool control apparatus, it includes a function unit specific to a machine tool control apparatus in addition to the above-described function units, but the description is omitted because the function unit is known to those skilled in the art.

The PLC 400 is an apparatus that inputs and outputs a signal by executing a program that has been commanded, such as a ladder program. The PLC 400 includes a CPU, a memory, a communication unit, or the like for performing various controls, arithmetic processing, and communication processing according to a ladder program, but they are not shown.

Figure 2:
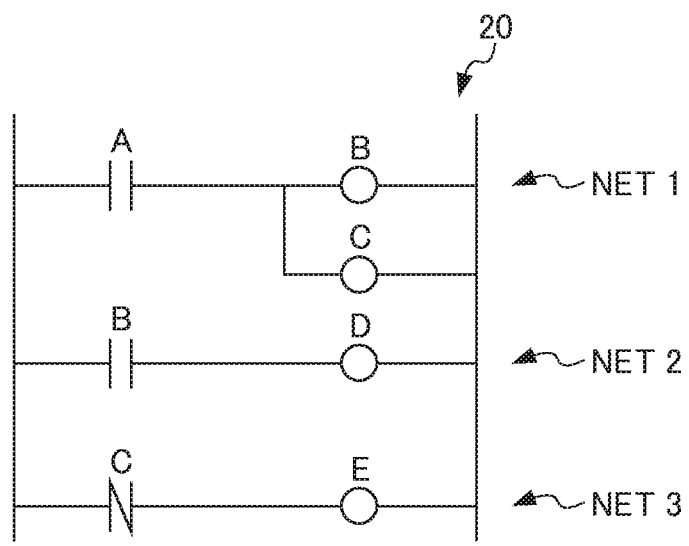
FIG. 2 is a diagram showing an example ladder used in the description of the present embodiment.
Figure 7:
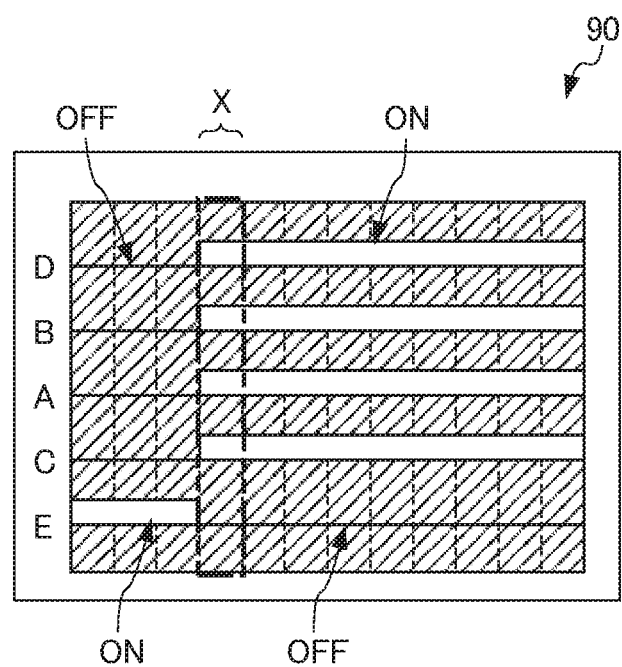
FIG. 7 is a graph showing tracing results of a conventional tracing apparatus.

Prior to describing the processing of the tracing apparatus 100 of the present embodiment, tracing results of a conventional tracing apparatus at the time of executing a ladder program will be described. FIG. 2 is a diagram showing an example ladder used in the description of the present embodiment. FIG. 7 is a graph showing tracing results of a conventional tracing apparatus. A ladder 20 shown in FIG. 2 shows the content of the processing of a ladder program. Constituent elements A to E are indicated in the ladder 20. In the ladder 20, when the signal of the constituent element A becomes ON, the signals of the constituent elements B to D become ON and the signal of the constituent element E becomes OFF.

FIG. 7 shows the tracing results 90 that are the execution results of the ladder program in the ladder 20. As shown in the tracing results 90 in FIG. 7, in the sampling cycle section X, the signals of the constituent elements A to D changes from OFF to ON, the signal of the constituent element E changes from ON to OFF, and the signals of the constituent elements A to E simultaneously change. In this instance, for example, the sequence of the constituent elements A and E in the section X actually depends on the net sequence. However, the tracing results 90 show that the signal states of the constituent elements A and E change at the same time; thus, the sequence of the signal changes of the constituent elements A and E is not known.

Figure 3:
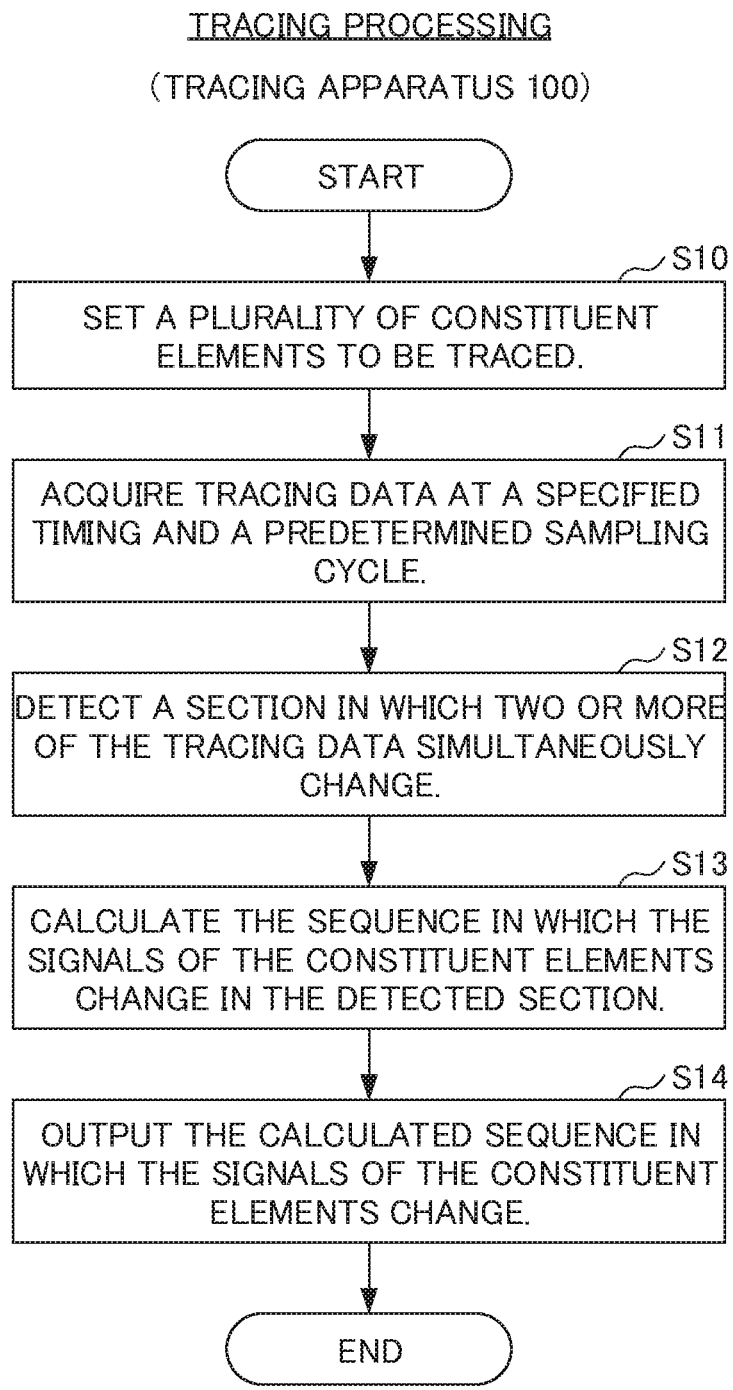
FIG. 3 is a flow chart showing the tracing processing of the tracing apparatus of the present embodiment.
Figure 4:
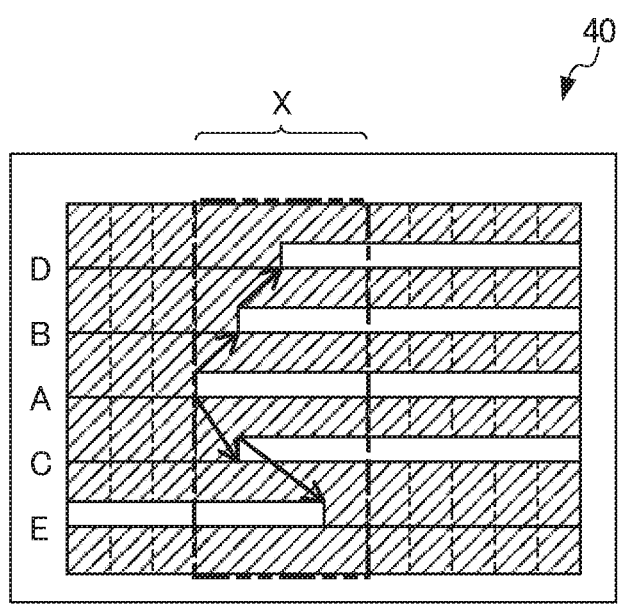
FIG. 4 is a graph showing tracing results of the tracing apparatus of the present embodiment.
Figure 5:
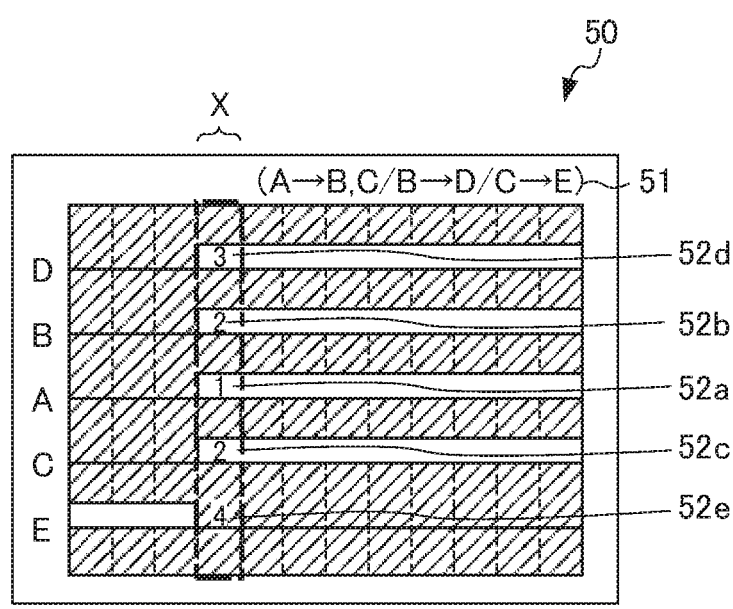
FIG. 5 is a graph showing tracing results of the tracing apparatus of the present embodiment.

The tracing results of the tracing apparatus 100 according to the present embodiment at the time of executing the ladder program will be described. FIG. 3 is a flow chart showing the tracing processing of the tracing apparatus 100 according to the present embodiment. FIGS. 4 and 5 are graphs showing tracing results of the tracing apparatus 100 according to the present embodiment.

In step S10 (hereinafter, step S is simply referred to as S) in FIG. 3, the control unit 110 (the constituent element setting unit 111) of the tracing apparatus 100 sets a plurality of constituent elements to be traced among the constituent elements of the ladder program through, for example, the input unit 130. The control unit 110 may, for example, have the ladder (see FIG. 2) of the ladder program to be traced displayed on the display unit 140 and accept a plurality of constituent elements through the input unit 130 to set the plurality of constituent elements. In addition, the control unit 110 may set a plurality of the constituent elements by setting all of the constituent elements of the ladder program and selecting constituent elements to be excluded. The control unit 110 has the set constituent elements stored in the constituent element storage unit 122.

In S11, the control unit 110 (the tracing data acquisition unit 112) acquires tracing data indicating a signal state of the constituent element at a specified timing, at a predetermined sampling cycle. The tracing data acquisition unit 112, for example, acquires the tracing data of the respective constituent elements obtained by executing the ladder program to be traced from the PLC 400. Then, the control unit 110 has the acquired tracing data stored in the tracing data storage unit 123. In S12, the control unit 110 (the section detection unit 113) detects a sampling cycle section in which two or more of the tracing data corresponding to the constituent elements acquired by the tracing data acquisition unit 112 simultaneously change. For example, in the case of the tracing data of the ladder 20 in FIG. 2, the section X of the tracing results 90 in FIG. 7 is detected.

In S13 of FIG. 3, the control unit 110 (the change sequence calculation unit 114) calculates the sequence in which the signals of the constituent elements change in the detected section. The control unit 110 analyzes the ladder and calculates the sequence in which the signals of the constituent elements change according to the processing flow. In the ladder 20 in FIG. 2, if all of the constituent elements A to E are set, the control unit 110 calculates the change sequence of the signal of the constituent element A as the first, that of the constituent elements B and C as the second, that of the constituent element D as the third, and that of the constituent element E as the fourth. In S14, the control unit 110 (the change sequence output unit 115) outputs the calculated sequence in which the signals of the constituent elements change. For example, the control unit 110 has the change sequence displayed on the display unit 140. Subsequently, the control unit 110 ends the present processing.

Specific examples of tracing results will be described.

Specific Example 1

FIG. 4 shows an example of displayed tracing results. In the tracing results 40 in FIG. 4, the tracing data is displayed by enlarging the section X as compared to the other sections. The tracing results 40 indicate the sequence in which the signals of the constituent elements change using arrows, and indicate the ON/OFF of the signals by displacing the positions of the signal changes in the change sequence. The tracing results 40 indicate the tracing data corresponding to the constituent elements, and explicitly indicate the change sequence by displacing the positions of the signal changes. Therefore, in the tracing results 40, the sequence in which the signals change within the cycle can be determined.

Specific Example 2

FIG. 5 shows another example of displayed tracing results. In the tracing results 50 in FIG. 5, the sequence in which the signals of the constituent elements change is indicated in the section X, with numerals 52a to 52e. The change sequence display section 51 displays the change sequence in the form of "a constituent element→a constituent element". The tracing results 50 explicitly indicate the change sequence by numerically indicating the change sequence on the tracing data corresponding to the constituent elements. Therefore, in the tracing results 50, the sequence in which the signals change within the cycle can be determined.

Specific Example 3

Figure 6A:
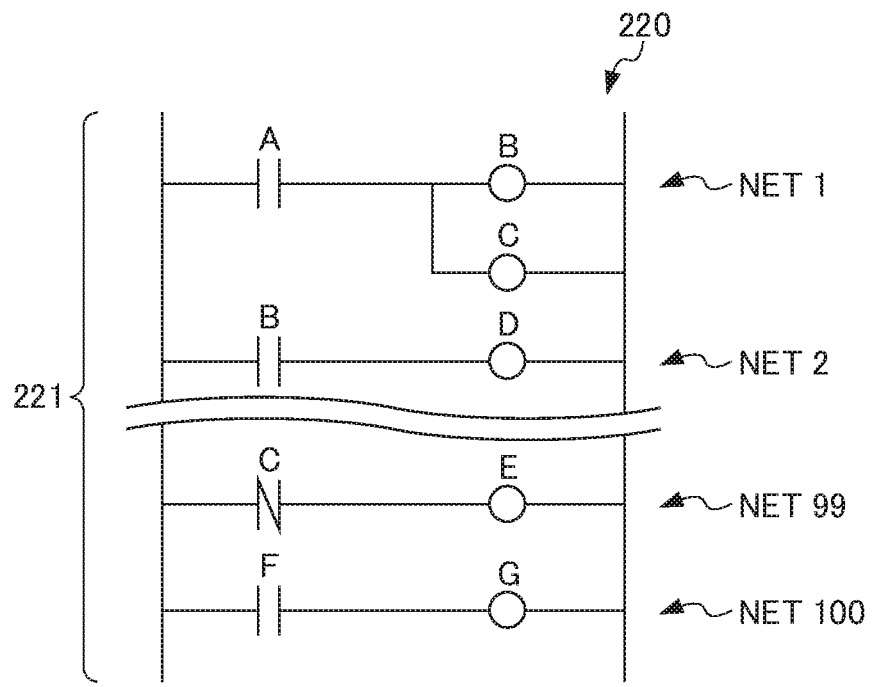
FIG. 6A is a diagram showing another example ladder used in the description of the present embodiment.
Figure 6B:
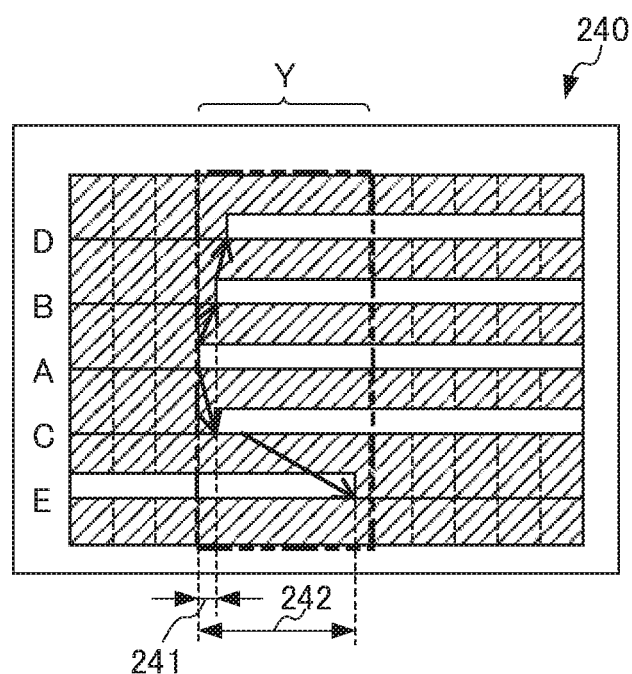
FIG. 6B is a graph showing tracing results of the tracing apparatus of the present embodiment.

A ladder program differing from the above-described specific examples 1 and 2 will be described. FIG. 6A is a diagram showing another example ladder used in the description of the present embodiment. FIG. 6B is a graph showing tracing results of the tracing apparatus 100 of the present embodiment. The ladder 220 shown in FIG. 6A shows an example of the processing content of the ladder program at the sampling cycle 221. In the ladder 220, nets 1, 2, 99, and 100 are shown, and constituent elements A to G are shown. In the ladder 220, when the signal of the constituent element A becomes ON, the signals of the constituent elements B to D become ON, and the signal of the constituent element E becomes OFF. Furthermore, when the signal of the constituent element F becomes ON, the signal of the constituent element G becomes ON.

FIG. 6B shows the tracing results 240 that are the execution results of the ladder program shown in the ladder 220. Prior to the output of the tracing results 240, constituent elements A to E are set as a plurality of constituent elements by the constituent element setting unit 111. In the sampling cycle section Y, the signals of the constituent elements A to D change from OFF to ON, the signal of the constituent element E changes from ON to OFF, and the signals of the constituent elements A to E change at the same time. Then, the control unit 110 enlarges the section Y as compared to the other sections. The control unit 110 calculates an approximate time until the signal of each of the constituent elements changes based on the sampling cycle 221 and the position of the signal change on the program, and displays the tracing result 240 at a length based on the calculation result.

In this regard, if the sampling cycle is c and the total net is n, the time t until the signal of the constituent element in the mth net changes is represented by the following equation:

$$t = c \times m/n$$

If the sampling cycle 221 is 10 msec and the total net is 100, the time until the signal of the constituent element B changes is 10×1/100=0.1 msec. In contrast, the time until the signal of the constituent element E changes is 10×99/100=9.9 msec. The length 241 between the constituent element A and the constituent element B is set at a length corresponding to 0.1 when the length of the section Y is set at 10. The length 242 between the constituent element A and the constituent element E is set at a length corresponding to 9.9 when the length of the section Y is set at 10. The tracing results 240 indicate the sequence in which the signals of the constituent elements change by using arrows. The tracing results 240 in FIG. 6B indicate tracing data corresponding to the constituent elements, by displacing the position of the signal change by a length based on the approximate time until the signal change. Therefore, the tracing results 240 enable the sequence of the signal changes within the cycle to be determined in more detail, including the timing.

Thus, in the tracing system 1000, the tracing apparatus 100 detects a sampling cycle section in which two or more of the tracing data of the constituent elements simultaneously change, and calculates and outputs the sequence in which the signals of the constituent elements change in the detected section. Therefore, the visibility of the tracing results output by the tracing apparatus 100 is improved. As a result, the time for analysis of signal correlation can be reduced.

In addition, in the present embodiment, the change sequence can be easily recognized by, in the tracing results, lengthening the section and showing the displaced positions of the signal changes in the change sequence or numerically indicating the change sequence. Furthermore, in the present embodiment, the tracing results are displayed not only in the change sequence but also by expressing the timing of change in terms of the ratio of length, thereby making it easier to recognize the timing of change.

Programs including operating programs used in the present invention may be stored using various types of non-transitory computer readable media and supplied to a computer. The non-transitory computer readable media include various types of tangible storage media. Examples of non-transitory computer readable media include magnetic recording media (e.g., flexible disks, magnetic tapes, hard disk drives), magneto-optical recording media (e.g., magneto-optical disks), CD-ROMs (read only memories), CD-Rs, CD-R/Ws, semiconductor memories (e.g., mask ROMs, PROMs (programmable ROMs), EPROMs (erasable PROMs), flash ROMs, RAMs (random access memories)). The programs may also be supplied to a computer by various types of transitory computer readable media. Examples of the transitory computer readable media include electric signals, optical signals, and electromagnetic waves. The transitory computer readable media can provide programs to a computer via wired communication paths such as electrical wires and optical fibers, or via radio communication paths.

The above-described embodiment is a preferred embodiment of the present invention, but the scope of the present invention is not limited to the above-described embodiment only. The present invention can be implemented in a form in which various modifications are made within a scope that does not depart from the gist of the present invention.

Modification 1

In the embodiment described above, the tracing apparatus is connected to the PLC, but the present invention is not limited thereto. The PLC may include a function of the tracing apparatus.

Modification 2

In the above-described embodiment, a ladder logic program is described as the sequence control program, but the present invention is not limited thereto. For example, the program may be another sequence control program such as a sequential function chart (SFC) logic.

Modification 3

In the above-described embodiment, tracing results including change sequence are displayed on the display unit, but the present invention is not limited thereto. The tracing results may be output to a file as data.

EXPLANATION OF REFERENCE NUMERALS

100 TRACING APPARATUS
110 CONTROL UNIT
111 CONSTITUENT ELEMENT SETTING UNIT
112 TRACING DATA ACQUISITION
113 SECTION DETECTION UNIT
114 CHANGE SEQUENCE CALCULATION UNIT
115 CHANGE SEQUENCE OUTPUT UNIT
120 STORAGE UNIT
122 CONSTITUENT ELEMENT STORAGE UNIT
123 TRACING DATA STORAGE UNIT
140 DISPLAY UNIT
400 PLC
1000 TRACING SYSTEM

What is claimed is:

1. A tracing apparatus communicably connected to a programmable logic controller (PLC) that inputs and outputs a signal based on a sequence control program, the tracing apparatus comprising a processor that performs the following:

setting a plurality of constituent elements to be traced among the constituent elements of the sequence control program;

acquiring, at a predetermined sampling cycle for each of the plurality of constituent elements, tracing data indicating a signal state of the constituent element at a specified timing, by executing the sequence control program at the PLC;

detecting, from a plurality of sampling cycle sections, a sampling cycle section in which two or more of the acquired tracing data corresponding to the plurality of constituent elements simultaneously change;

calculating change sequence of signals of the plurality of constituent elements simultaneously changing in the detected sampling cycle section by analyzing a sequence diagram representing the execution of the sequence control program during the detected sample cycle section, the sequence diagram being a processing flow of the plurality of constituent elements; and outputting the calculated change sequence of the signals of the plurality of constituent elements, wherein the outputting of the calculated change sequence of the signals of the plurality of constituent elements includes (i) outputting, to a display, the plurality of sampling cycle sections including the detected sampling cycle section such that the detected sampling cycle section is enlarged as compared to the the plurality of sampling cycle sections other than the detected sampling cycle section and (ii) explicitly outputting, to the display, the change sequence of the signals of the constituent elements in the detected sampling cycle section by displacing positions of changes of the signals of the plurality of constituent elements according to the calculated change sequence of the signals of the plurality of constituent elements.

2. The tracing apparatus according to claim 1, wherein the outputting of the change sequence of the signals of the constituent elements includes outputting the calculated change sequence of the signals of the constituent elements as an indication according to a change time.

3. The tracing apparatus according to claim 1, wherein the outputting of the change sequence of the signals of the constituent elements includes outputting a number corresponding to the calculated change sequence of the signals of the constituent elements.

4. The tracing apparatus according to claim 1, wherein the outputting of the change sequence of the signals of the constituent elements includes outputting the calculated change sequence of the signals of the constituent elements together with the tracing data to a file.

5. The tracing apparatus according to claim 1, wherein the tracing apparatus is included in the PLC.

6. The tracing apparatus according to claim 1, wherein, for each of the positions of changes of the signals of the constituent elements, the position of the change of the signal is displaced from a start of the detected sampling cycling section by a length based on an approximate time from the start of the detected sampling cycling section until the signal change.

7. The tracing apparatus according to claim 1, wherein, on the display, the change sequence of the signals of the constituent elements in the detected sampling cycle section is indicated using arrows.

* * * * *